United States Patent
Paetzold et al.

(10) Patent No.: US 6,940,454 B2
(45) Date of Patent: Sep. 6, 2005

(54) METHOD AND SYSTEM FOR GENERATING FACIAL ANIMATION VALUES BASED ON A COMBINATION OF VISUAL AND AUDIO INFORMATION

(75) Inventors: Frank Paetzold, Venice, CA (US); Ulrich F. Buddemeier, Venice, CA (US); Yevgeniy V. Dzhurinskiy, Santa Monica, CA (US); Karin M. Derlich, Culver City, CA (US); Hartmut Neven, Santa Monica, CA (US)

(73) Assignee: Nevengineering, Inc., Santa Monica, CA (US)

( * ) Notice: Subject to any disclaimer, the term of this patent is extended or adjusted under 35 U.S.C. 154(b) by 286 days.

(21) Appl. No.: 09/929,516

(22) Filed: Aug. 13, 2001

(65) Prior Publication Data

US 2002/0118195 A1 Aug. 29, 2002

Related U.S. Application Data

(63) Continuation-in-part of application No. 09/871,370, filed on May 31, 2001, which is a continuation of application No. 09/188,079, filed on Nov. 6, 1998, now Pat. No. 6,272,231.
(60) Provisional application No. 60/081,615, filed on Apr. 13, 1998.

(51) Int. Cl.$^7$ ............................................. G06T 15/00
(52) U.S. Cl. ....................................................... 343/473
(58) Field of Search ............................... 345/473, 474, 345/475, 619; 704/236, 235

(56) References Cited

U.S. PATENT DOCUMENTS

| | | |
|---|---|---|
| 4,725,824 A | 2/1988 | Yoshioka |
| 4,805,224 A | 2/1989 | Koezuka et al. |
| 4,827,413 A | 5/1989 | Baldwin et al. |
| 5,159,647 A | 10/1992 | Burt |
| 5,168,529 A | 12/1992 | Peregrim et al. |
| 5,187,574 A | 2/1993 | Kosemura et al. |
| 5,220,441 A | 6/1993 | Gerstenberger |
| 5,280,530 A | 1/1994 | Trew et al. |
| 5,333,165 A | 7/1994 | Sun |
| 5,383,013 A | 1/1995 | Cox |
| 5,430,809 A | 7/1995 | Tomitaka |
| 5,432,712 A | 7/1995 | Chan |
| 5,511,153 A | 4/1996 | Azarbayejani et al. |
| 5,533,177 A | 7/1996 | Wirtz et al. |
| 5,550,928 A | 8/1996 | Lu et al. |

(Continued)

OTHER PUBLICATIONS

Notification of Transmittal of the International Search Report or the Declaration, International Search Report for PCT/US02/23973, mailed Nov. 18, 2002.

Valente, Stephanie et al., "A Visual Analysis/Synthesis Feedback Loop for Accurate Face Tracking", Signal Processing Image Communication, Elsevier Science Publishers, vol. 16, No. 6, Feb. 2001, pp. 585–608.

(Continued)

*Primary Examiner*—Shih-Chao Chen
*Assistant Examiner*—Huedung X. Cao
(74) *Attorney, Agent, or Firm*—Robroy R. Fawcett

(57) ABSTRACT

Facial animation values are generated using a sequence of facial image frames and synchronously captured audio data of a speaking actor. In the technique, a plurality of visual-facial-animation values are provided based on tracking of facial features in the sequence of facial image frames of the speaking actor, and a plurality of audio-facial-animation values are provided based on visemes detected using the synchronously captured audio voice data of the speaking actor. The plurality of visual facial animation values and the plurality of audio facial animation values are combined to generate output facial animation values for use in facial animation.

20 Claims, 3 Drawing Sheets

U.S. PATENT DOCUMENTS

| | | | |
|---|---|---|---|
| 5,581,625 A | | 12/1996 | Connell |
| 5,588,033 A | | 12/1996 | Yeung |
| 5,608,839 A | * | 3/1997 | Chen .......................... 704/235 |
| 5,680,487 A | | 10/1997 | Markandey |
| 5,699,449 A | | 12/1997 | Javidi |
| 5,714,997 A | | 2/1998 | Anderson |
| 5,715,325 A | | 2/1998 | Bang et al. |
| 5,719,954 A | | 2/1998 | Onda |
| 5,736,982 A | | 4/1998 | Suzuki et al. |
| 5,764,803 A | | 6/1998 | Jacquin et al. |
| 5,774,591 A | | 6/1998 | Black et al. |
| 5,802,220 A | | 9/1998 | Black et al. |
| 5,809,171 A | | 9/1998 | Neff et al. |
| 5,828,769 A | | 10/1998 | Burns |
| 5,875,108 A | * | 2/1999 | Hoffberg et al. .............. 700/17 |
| 5,917,937 A | | 6/1999 | Szeliski et al. |
| 5,982,853 A | | 11/1999 | Liebermann |
| 5,995,119 A | | 11/1999 | Cosatto et al. |
| 6,011,562 A | | 1/2000 | Gagné |
| 6,044,168 A | | 3/2000 | Tuceryan et al. |
| 6,052,123 A | | 4/2000 | Lection et al. |
| 6,115,052 A | * | 9/2000 | Freeman et al. ............ 345/473 |
| 6,181,351 B1 | * | 1/2001 | Merrill et al. .............. 345/473 |
| 6,320,583 B1 | * | 11/2001 | Shaw et al. .................. 345/619 |
| 6,504,546 B1 | * | 1/2003 | Cosatto et al. .............. 345/473 |

OTHER PUBLICATIONS

Yang, Tzong Jer, "Face Analysis and Synthesis", Jun. 1, 1999, Retrieved from the Internet, http://www.cmlab.csie.ntu.edu.tw/ on Oct. 25, 2002, 2 pg.

Yang, Tzong Jer, "VR–Face: An Operator Assisted Real–Time Face Tracking System", Communication and Multimedia Laboratory, Dept. of Computer Science and Information Engineering, National Taiwan University, Jun. 1999, pp. 1–6.

Akimoto, T., et al., "Automatic Creation of Facial 3D Models", IEEE Computer Graphics & Apps., pp. 16–22, Sep. 1993.

Ayache, N. et al., "Rectification of Images for Binocular and Trinocular Stereovision", Proc. Of 9th Int'l., Conference on Pattern Recognition, 1, pp. 11–16, Italy, 1988.

Belhumeur, P., "A Bayesian Approach to Binocular Stereopsis", *Int'l. J. Of Computer Vision*, 19 (3), pp. 237–260, 1996.

Beymer, D.J., "Face Recognition Under Varying Pose", MIT A.I. Lab, Memo No. 1461, pp. 1–13, Dec. 1993.

Beymer, D.J., "Face Recognition Under Varying Pose", MIT A.I. Lab. Research Report, 1994, pp. 756–761.

Buhmann, J. et al., "Distortion Invariant Object Recognition By Matching Hierarchically Labeled Graphs", In Proceedings IJCNN Int'l Conf. Of Neural Networks, Washington, D.C. Jun. 1989, pp. 155–159.

DeCarlo, D., et al., "The Integration of Optical Flow and Deformable Models with Applications to Human Face Shape and Motion Estimation", pp. 1–15, In Proc. CVPR '96, pp. 231–238 (published)[TM Sep. 18, 1996].

Devernay, F. et al., "Computing Differential Properties of 3–D Shapes from Steroscopic Images without {3–D} Models", INRIA, RR–2304, pp. 1–28, Sophia, Antipolis, 1994.

Dhond, U., "Structure from Stereo: a Review", IEEE Transactions on Systems, Man, and Cybernetics, 19(6), pp. 1489–1510, 1989.

Fleet, D.J. et al., "Computation of Component Image Velocity from Local Phase Information", *Int., J. Of Computer Vision*, 5:1, pp. 77–104 (1990).

Fleet, D.J., et al. *Measurement of Image Velocity*, Kluwer Academic Press, Boston, pp. I–203, 1992.

Hall, E.L., "Computer Image Processing And Recognition", Academic Press 1979, 99. 468–484.

Hong, H.,et al., "Online Facial Recognition based on Personalized Gallery", Proceedings of Int'l Conference On Automatic Face And Gesture Recognition, pp. 1–6, Japan Apr. 1997.

Kolocsai, P., et al, Statistical Analysis of Gabor–Filter Representation, *Proceedings of International Conference on Automatic Face and Gesture Recognition*, 1997, 4 pp.

Kruger, N., "Visual Learning with a priori Constraints", *Shaker Verlag*, Aachen, Germany, 1998, pp. 1–131.

Kruger, N., et al, "Principles of Cortical Processing Applied to and Motivated by Artificial Object Recognition", Institut fur Neuroinformatik, *Internal Report 97–17*, Oct. 1997, pp. 1–12.

Kruger, N., et al, "Autonomous Learning of Object Representations Utilizing Self–Controlled Movements", 1998, *Proceedings of NN98*, 5 pp.

Kruger, N., et al, "Object Recognition with a Sparse and Autonomously Learned Representation Based on Banana Wavelets", *Internal Report 96–11*, Institut fur Neuroinformatik, Dec. 1996, pp. 1–24.

Kruger, N., et al., "Object Recognition with Banana Wavelets", *European Symposium on Artificial Neural Networks* (ESANN97), 1997, 6 pp.

Kruger, N., "An Algorithm for the Learning of Weights in Discrimination Functions Using a priori Constraints", *IEEE Transactions on Pattern Analysis and Machine Intelligence*, vol. 19, No. 7, Jul. 1997, pp. 764–768.

Lades, M., et al, "Distortion Invarient Object Recognition in the Dynamic Link Architecture", *IEEE Transactions on Computers*, vol. 42, No. 3, 1993, 11 pp.

Luong, Q. T., et al, "The Fundamental Matrix, Theory, Algorithm, and Stability Analysis", *INRIA*, 1993, pp. 1–46.

Manjunath, B. S., et al, "A Feature Based Approach to Face Recognition", *In Proceedings IEEE Conference on Computer Vision and Pattern Recognition*, pp. 373–378, Mar. 1992.

Mauer, T., et al, "Single–View Based Recognition of Faces Rotated in Depth", *In Proceedings of the International Workshop on Automatic Face and Gesture Recognition*, pp. 248–253, Zurich, CH, Jun. 26, 1995.

Mauer, T., et al, "Learning Feature Transformations to Recognize Faces Rotated in Depth", *In Proceedings of the International Conference on Artificial Neural Networks*, vol. 1, pp. 353–358, Paris, France, Oct. 9–13, 1995.

Mauer, T., et al, "Tracking and Learning Graphs and Pose on Image Sequences of Faces", *Proceedings of 2nd International Conference on Automatic Face and Gesture Recognition*, Oct. 14–16, 1996, pp. 176–181.

Maybank, S. J., et al, "A Theory of Self–Calibration of a Moving Camera", *International Journal of Computer Vision*, 8(2), pp. 123–151, 1992.

McKenna, S.J., et al, Tracking Facial Feature Points With Gabor Wavelets and Shape Models, (*publication & date unknown*), 6 pp.

Okada, K., et al, "The Bochum/USC Face Recognition System", 19 pp. (*publication & date unknown*).

Okutomi, M., et al, "A Multiple–Baseline Stereo", *IEEE Trans. on Pattern Analysis and Machine Intelligence*, vol. 15, No. 4, pp. 353–363, Apr. 1993.

Peters, G., et al, "Learning Object Representations by Clustering Banana Wavelet Responses", *Tech. Report IR–INI 96–09*, Institut fur Neuroinformatik, Ruhr Universitat, Bochum, 1996, 6 pp.

Phillips, P. J., et al, "The Face Recognition Technology (FERET) Program", *Proceedings of Office of National Drug Control Policy*, CTAC International Technology Symposium, Aug. 18–22, 1997, 10 pages.

Pighin, F, et al, "Synthesizing Realistic Facial Expressions from Photographs", In SIGGRAPH 98 Conference Proceedings, pp. 75–84, Jul. 1998.

Roy, S., et al, "A Maximum Flow Formulation of the N–Camera Stereo Correspondence Problem", *IEEE, Proceedings of International Conference on Computer Vision*, Bombay, India, Jan. 1998, pp. 1–6.

Sara, R. et al "3–D Data Acquision and Interpretation for Virtual Reality and Telepresence", *Proceedings IEEE Workshop Computer Vision for Virtual Reality Based Human Communication*, Bombay, Jan. 1998, 7 pp.

Sara, R. et al "Fish–Scales: Representing Fuzzy Manifolds", *Proceedings International Conference Computer Vision*, ICCV '98, pp. 811–817, Bombay, Jan. 1998.

Sara, R., et al, "On Occluding Contour Artifacts in Stereo Vision", *IEEE, Proceedings of International Conference Computer Vision and Pattern Recognition*, Puerto Rico, 1997, 6 pp.

Steffens, J., et al, "PersonSpotter—Fast and Robust System for Human Detection, Tracking, and Recognition", *Proceedings of International Conference on Automatic Face and Gesture Recognition*, 6 pp., Japan—Apr. 1998.

Theimer, W.M., et al, "Phase–Based Binocular Vergence Control and Depth Reconstruction using Active Vision", *CVGIP: Image Understanding*, vol. 60, No. 3, Nov. 1994, pp. 343–358.

Tomasi, C., et al., "Stereo Without Search", *Proceedings of European Conference on Computer Vision*, Cambridge, UK, 1996, 14 pp. (7 sheets).

Triesch, J., et al, "Robust Classification of Hand Postures Against Complex Backgrounds", *Proceedings of the Second International Conference on Automatic Face and Gesture Recognition*, Killington, VT, Oct. 1996, 6 pp.

Turk, M., et al, "Eigenfaces for Recognition", *Journal of Cognitive Neuroscience*, vol. 3, No. 1, pp. 71–86, 1991.

Wiskott, L., et al, "Face Recognition and Gender Determination", *Proceedings of International Workshop on Automatic Face and Gesture Recognition*, pp. 92–97, Zurich CH, Jun. 26, 1995.

Wiskott, L., et al, "Face Recognition by Elastic Bunch Graph Matching", *Internal Report, IR–INI 96–08*, Institut fur Neuroinformatik, Ruhr–Universitat, Bochum, pp. 1–21, Apr. 1996.

Wiskott, L., "Labeled Graphs and Dynamic Link Matching for Face Recognition and Scene Analysis", *Verlag Harr Deutsch*, Thun–Frankfurt am Main. Reihe Physik, Dec. 1995, pp. 1–109.

Wiskott, L., "Phanton Faces for Face Analysis". *Proceedings of 3rd Joint Symposium on Neural Computation*, Pasadena, CA, vol. 6, pp. 46–52, Jun. 1996.

Wiskott, L., "Phanton Faces for Face Analysis", *Internal Report, IR–INI 96–06*, Institut fur Neoroinformatik, Ruhr–Universitat, Bochum, Germany, Apr. 1996, 12 pp.

Wiskott, L. "Phantom Faces for Face Analysis", *Pattern Recognition*, vol. 30, No. 6, pp. 837–846, 1997.

Wiskott, L., et al, "Face Recognition by Elastic Bunch Graph Matching", *IEEE Transactions on Pattern Analysis and Machine Intelligence*, 19(7), pp. 775–779, 1997.

Wong, R., et al, "PC–Based Human Face Recognition System", *IEEE*, pp. 641–644, 1992.

Wurtz, R., "Object Recognition Robust Under Translations, Deformations, and Changes in Background", *IEEE Transactions on Patern Analysis and Machine Intelligence*, vol. 19, No. 7, Jul. 1997, pp. 769–775.

Wurtz, R., et al, "Corner Detection in Color Images by Multiscale Combination of End–stopped Cortical Cells", *Artificial Neural Networks—ICANN '97*, Lecture Notes in Computer Science, vol. 1327, pp. 901–906, Springer–Verlag, 1997.

Yao, Y., et al, "Tracking a Dynamic Set of Feature Points", *IEEE Transactions on Image Processing*, vol. 4, No. 10, Oct., 1995, pp. 1382–1394.

\* cited by examiner

METHOD AND SYSTEM FOR GENERATING FACIAL ANIMATION VALUES BASED ON A COMBINATION OF VISUAL AND AUDIO INFORMATION

This is a continuation-in-part of U.S. patent application Ser. No. 09/871,370, filed May 31, 2001, which is a continuation of U.S. patent application Ser. No. 09/188,079, filed Nov. 6, 1998, now U.S. Pat. No. 6,272,231, which claims priority from U.S. Provisional Application No. 60/081,615, filed Apr. 13, 1998.

BACKGROUND OF THE INVENTION

The present invention relates to avatar animation, and more particularly, to facial feature tracking.

Virtual spaces filled with avatars are an attractive the way to allow for the experience of a shared environment. However, animation of a photo-realistic avatar often requires tedious efforts to generate realistic animation information.

Accordingly, there exists a significant need for improved techniques for generating animation information. The present invention satisfies this need.

SUMMARY OF THE INVENTION

The present invention is embodied in a method, and related apparatus, for generating facial animation values using a sequence of facial image frames and synchronously captured audio data of a speaking actor. In the method, a plurality of visual facial animation values are provided based on tracking, without using markers on the speaking actor, of facial features in the sequence of facial image frames of the speaking actor, and a plurality of audio facial animation values are provided based on visemes detected using the synchronously captured audio voice data of the speaking actor. The plurality of visual facial animation values and the plurality of audio facial animation values are combined to generate output facial animation values for use in facial animation.

In more detailed features of the invention, the output facial animation values associated with a mouth for a facial animation may be based only on the respective mouth-associated values of the plurality of audio facial animation values. Alternatively, the output facial animation values associated with a mouth for a facial animation may be based on a weighted average of the respective mouth-associated values of the plurality of visual facial animation values and the respective mouth-associated values of the plurality of audio facial animation values. Also, the output facial animation values associated with a mouth for a facial animation may be based on Kalman filtering of the respective mouth-associated values of the plurality of visual facial animation values and the respective mouth-associated values of the plurality of audio facial animation values. Further, the step of combining the plurality of visual facial animation values and the plurality of audio facial animation values to generate output facial animation values may include detecting whether speech is occurring in the synchronously captured audio voice data of the speaking actor and, while speech is detected as occurring, generating the output facial animation values associated with a mouth based only on the respective mouth-associated values of the plurality of audio facial animation values and, while speech is not detected as occurring, generating the output facial animation values associated with the mouth based only on the respective mouth-associated values of the plurality of visual facial animation values.

In other more detailed features of the invention, the tracking of facial features in the sequence of facial image frames of the speaking actor may be performed using bunch graph matching, or using transformed facial image frames generated based on wavelet transformations, such as Gabor wavelet transformations, of the facial images.

Other features and advantages of the present invention should be apparent from the following description of the preferred embodiments taken in conjunction with the accompanying drawings, which illustrate, by way of example, the principles of the invention.

DETAILED DESCRIPTION OF THE PREFERRED EMBODIMENTS

The present invention is embodied in a method, and related apparatus, for generating facial animation values using a sequence of facial image frames and synchronously captured audio data of a speaking actor.

Figure 1:
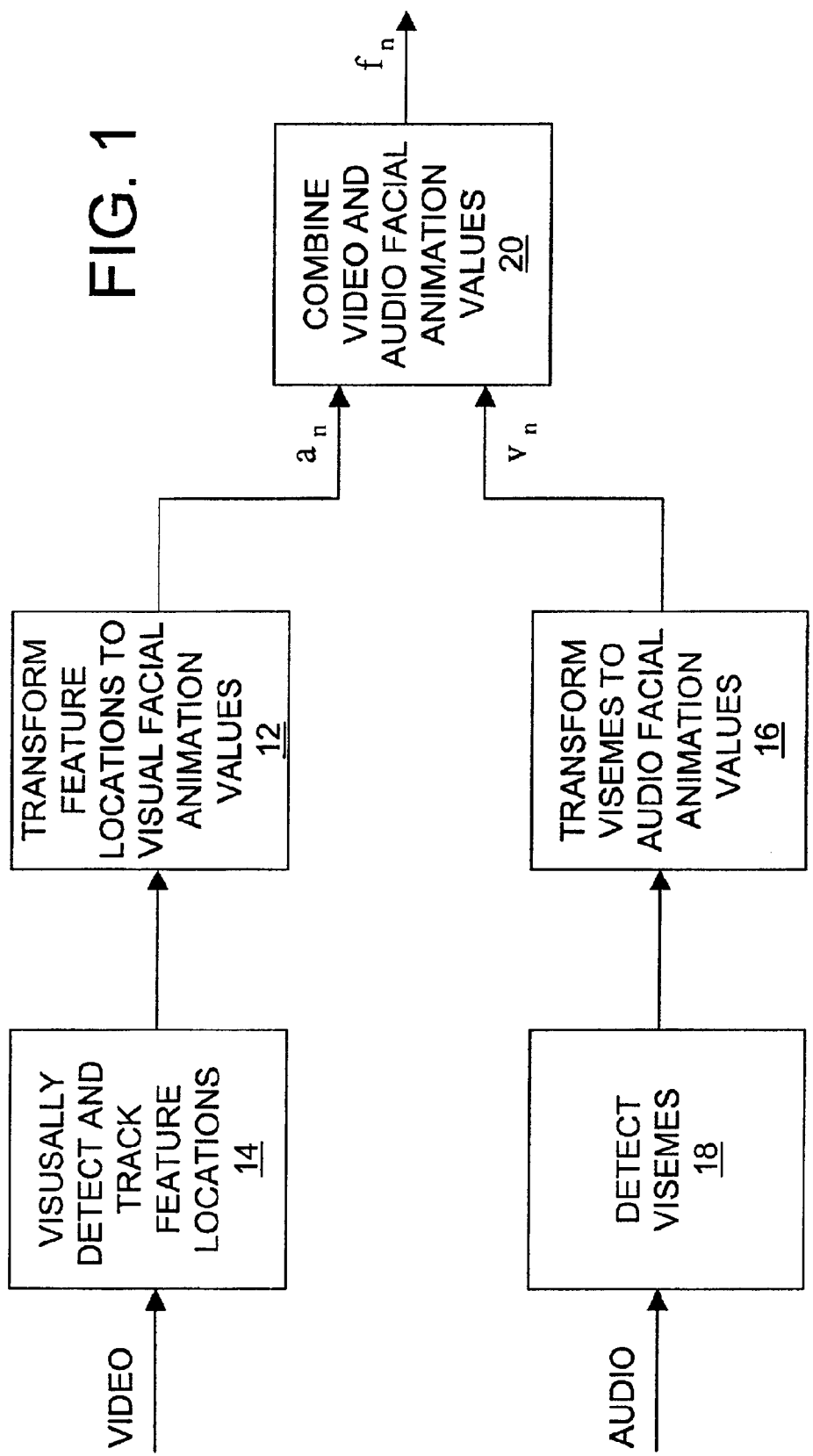
FIG. 1 is a flow diagram for illustrating a method for generating facial animation values using a sequence of facial image frames and synchronously captured audio data of a speaking actor, according to the present invention.

As shown in FIG. 1, the method includes providing a plurality of visual-facial-animation values $v_n$ (step 12) based on tracking of facial features in the sequence of facial image frames of the speaking actor (step 14), and providing a plurality of audio-facial-animation values $a_n$ (step 16) based on visemes detected using the synchronously captured audio voice data of the speaking actor (step 18). The plurality of visual facial animation values and the plurality of audio facial animation values are combined to generate output facial animation values $f_n$ for use in facial animation (step 20).

The output facial animation values associated with a mouth in the facial animation may be based only on the respective mouth-associated values of the plurality of audio facial animation values. The combination of the visually generated facial animation values and the audio-based mouth animation values provides advantageous display of animated avatars.

The visemes are a visual equivalent of phonemes, i.e., visemes are related to facial expressions that are associated with temporal speech units in audio voice data. For the English language, it is generally agreed that there may be 15 visemes associated with 43 possible phomenes. Speech analysis and viseme detection may be accomplished with analysis products produced by LIPSinc, Inc., of Morrisville, N.C. (www.lipsinc.com).

The facial animation values or tags may be displacement values relative to neutral face values. Advantageously, 8 to 22 (or more) facial animation values may be used to define and animate the mouth, eyes, eyebrows, nose, and the head angle. Representative facial animation values for the mouth may include vertical mouth position, horizontal mouth position, mouth width, lip distance, and mouth corner position (left and right).

Figure 2:
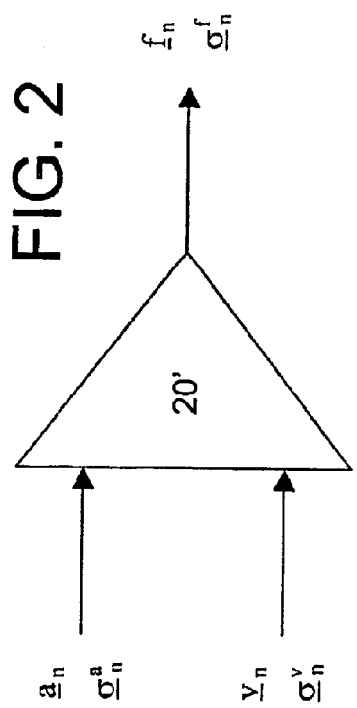
FIG. 2 is a flow diagram for illustrating a technique for combining visual facial animation values and audio facial animation values, according to the present invention.

With reference to FIG. 2, the output facial animation values $f_n$ associated with a mouth in the facial animation may be based on a weighted average (Equation 1) of the respective mouth-associated values of the plurality of visual facial animation values $v_n$ and the respective mouth-associated values of the plurality of audio facial animation values $a_n$ (step 22'). The visual facial animation values and the audio facial animation values may be assigned weights, $\sigma^v$ and $\sigma^a$, respectively, that are proportional to an uncertainty of the animation values. The merging of the values may be memoryless, i.e., each combined value may be the result of present values, exclusively.

$$\left( \underline{f}_n = \frac{\sigma_n^a}{\sigma_n^a + \sigma_n^v} \cdot a_n + \frac{\sigma_n^v}{\sigma_n^v + \sigma_n^a} \cdot v_n \right)_i \quad \text{Equation 1}$$

Alternatively, the combined values may be based on recursive estimates using a series of the animation values. Accordingly, the output facial animation values associated with a mouth in the facial animation are based on Kalman filtering of the respective mouth-associated values of the plurality of visual facial animation values and the respective mouth-associated values of the plurality of audio facial animation values. The Kalman filtering may be accomplished in accordance with Equations 2–7.

$$\underline{f}_n = \underline{A}_{n-q} \cdot \underline{f}_{n-q} \quad \text{Equation 2}$$

$$\underline{\hat{f}}_n = \underline{f}_n + \underline{K}_n \begin{bmatrix} (a_n - f_n) \\ (v_n - f_n) \end{bmatrix} \quad \text{Equation 3}$$

$$\underline{\tilde{p}}_n^f = \underline{A}_{n-q} \cdot \underline{\tilde{p}}_{n-a}^f \cdot \underline{A}_{n-q} + \underline{Q}_{n-q} \quad \text{Equation 4}$$

$$\underline{K}_n = \underline{\tilde{p}}_n^f \left( \underline{\tilde{p}}_n^f + \underline{R}_n \right)^{-q} \quad \text{Equation 5}$$

$$\underline{m}_n = \underline{f}_n \quad \text{Equation 6}$$

$$\underline{\tilde{p}}_n = (I - \underline{K}) \cdot \underline{\tilde{p}}_n^f \quad \text{Equation 7}$$

Figure 3:
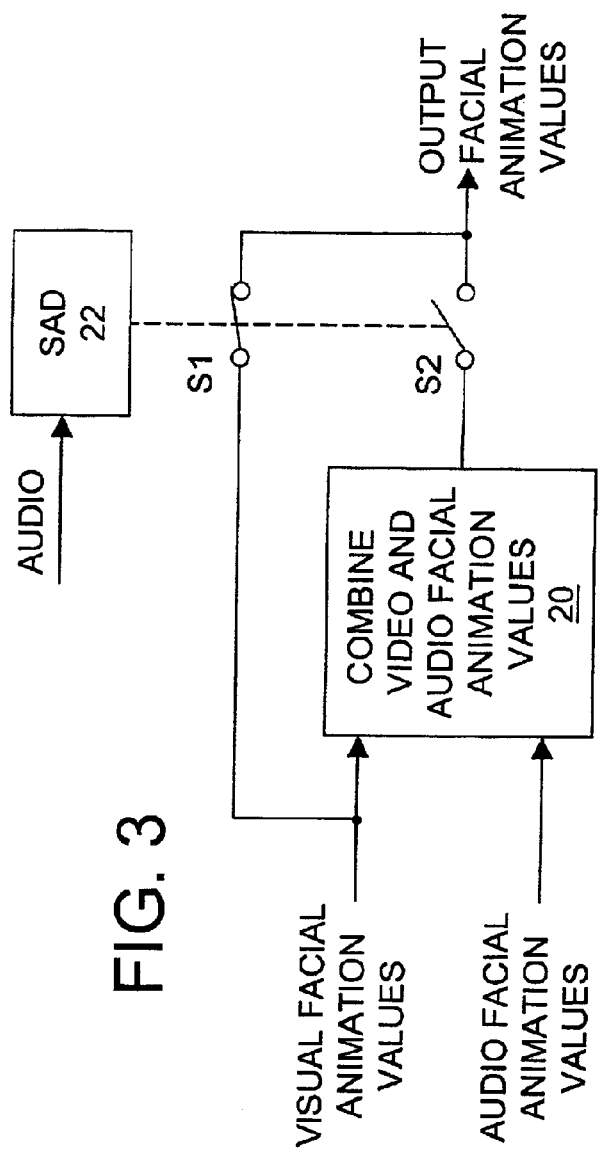
FIG. 3 is a block diagram for illustrating a technique for selectively combining visual facial animation values and audio facial animation values, according to the present invention.

With reference to FIG. 3, the step of combining the plurality of visual facial animation values and the plurality of audio facial animation values to generate output facial animation values may include detecting whether speech is occurring in the synchronously captured audio voice data of the speaking actor. While speech is detected as occurring, the output facial animation values associated with a mouth may be generated based only on the respective mouth-associated values of the plurality of audio facial animation values (switch S1 open, switch S2 closed). While speech is not detected as occurring, the output facial animation values associated with a mouth may be generated based only on the respective mouth-associated values of the plurality of visual facial animation values (S1 closed, S2 open).

Figure 4:
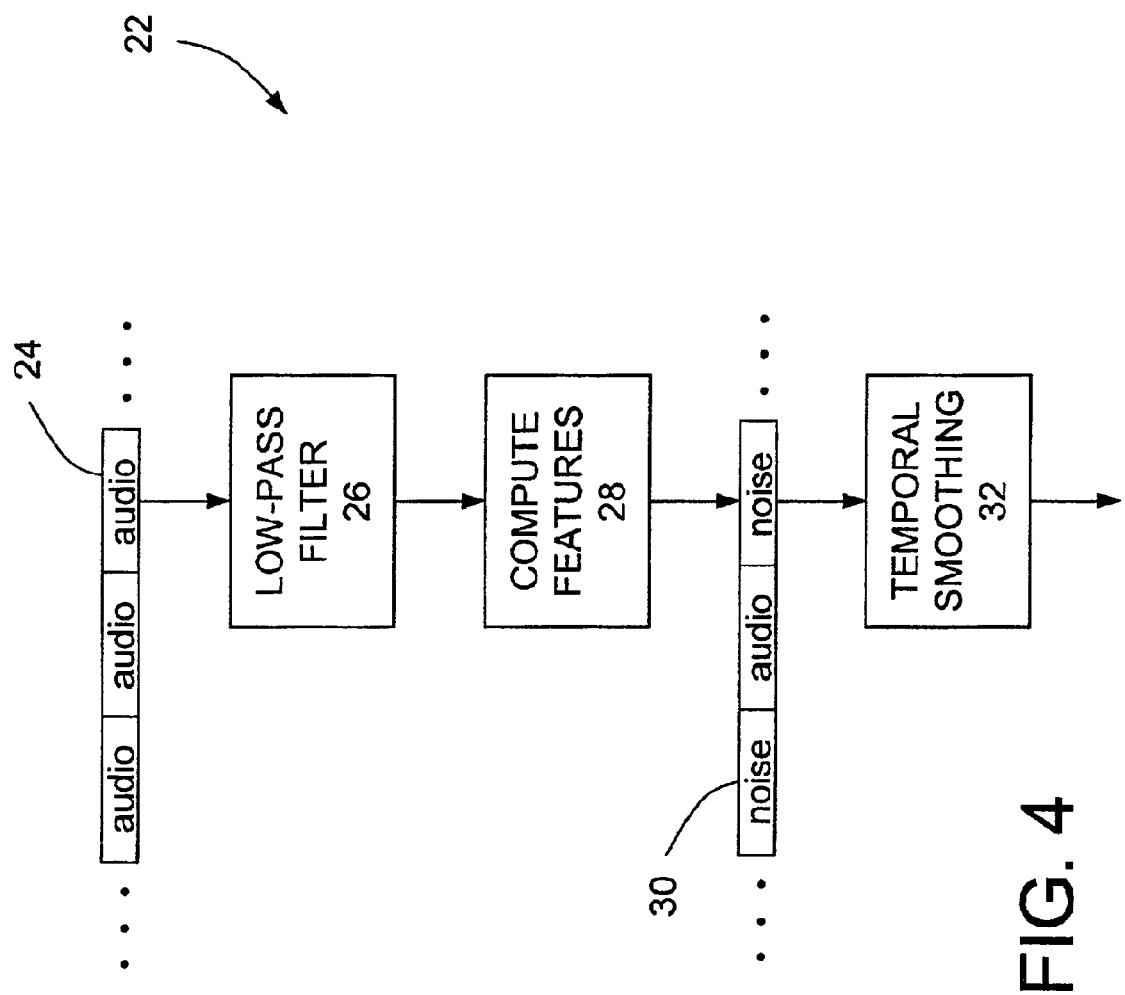
FIG. 4 is a block diagram of a technique for detecting speech activity in audio data.

The switches, S1 and S2, may be controlled by a Speech Activity Detector 22 (SAD). The operation of the SAD is described with reference to FIG. 4. The audio voice data 24 is filtered by a low-pass filter (step 26), and the audio features are computed for separating speech activity from background noise (step 28). The background noise may be characterized to minimize its effect on the SAD. The noise and audio speech indications 30 are temporally smoothed to decrease the effects of spurious detections of audio speech. (step 32).

The tracking of facial features in the sequence official image frames of the speaking actor may be performed using bunch graph matching, or using transformed facial image frames generated based on wavelet transformations, such as Gabor wavelet transformations, of the facial image frames. Wavelet-based tracking techniques are described in U.S. Pat. No. 6,272,231. The wavelet-based sensing allows tracking of a person's natural characteristics without any unnatural elements to interfere with the person's natural characteristics. Existing methods of facial feature sensing typically use markers that are glued to a person's face. The use of markers for facial motion capture is cumbersome and has generally restricted the use of facial motion capture to high-cost applications such as movie production. The entire disclosure, of U.S. Pat. No. 6,272,231 is hereby incorporated herein by reference. The techniques of the invention may be accomplished using generally available image processing systems.

Although the foregoing discloses the preferred embodiments of the present invention, it is understood that those skilled in the art may make various changes to the preferred embodiments without departing from the scope of the invention. The invention is defined only by the following claims.

We claim:

1. Method for generating facial animation values using a sequence of facial image frames and synchronously captured audio data of a speaking actor, comprising the steps for:
   providing a plurality of visual-facial-animation values based on tracking of facial features in the sequence of facial image frames of the speaking actor;
   providing a plurality of audio-facial-animation values based on visemes detected using the synchronously captured audio voice data of the speaking actor; and
   combining the plurality of visual facial animation values and the plurality of audio facial animation values to generate output facial animation values for use in facial animation.

2. Method for generating facial animation values as defined in claim 1, wherein the output facial animation values associated with a mouth for a facial animation are based only on the respective mouth-associated values of the plurality of audio facial animation values.

3. Method for generating facial animation values as defined in claim 1, wherein the output facial animation values associated with a mouth for a facial animation are based on a weighted average of the respective mouth-associated values of the plurality of visual facial animation values and the respective mouth-associated values of the plurality of audio facial animation values.

4. Method for generating facial animation values as defined in claim 3, wherein the output facial animation values are calculated using the following equation:

$$\left( \underline{f}_n = \frac{\sigma_n^a}{\sigma_n^a + \sigma_n^v} \cdot a_n + \frac{\sigma_n^v}{\sigma_n^v + \sigma_n^a} \cdot v_n \right)_i$$

where:
$f_n$ are the output facial animation values;
$v_n$ are the visual facial animation values;
$a_n$ are the respective mouth-associated values of the audio facial animation values;
$\sigma_n^a$ are the weights for the audio facial animation values; and
$\sigma_n^v$ are the weights for the visual facial animation values.

5. Method for generating facial animation values as defined in claim 1, wherein the output facial animation values associated with a mouth for a facial animation are based on Kalman filtering of the respective mouth-associated values of the plurality of visual facial animation values and the respective mouth-associated values of the plurality of audio facial animation values.

6. Method for generating facial animation values as defined in claim 1, wherein the step of combining the plurality of visual facial animation values and the plurality of audio facial animation values to generate output facial animation values includes detecting whether speech is occurring in the synchronously captured audio voice data of the speaking actor and, while speech is detected as occurring, generating the output facial animation values associated with a mouth based only on the respective mouth-associated values of the plurality of audio facial animation values and, while speech is not detected as occurring, generating the output facial animation values associated with a mouth based only on the respective mouth-associated values of the plurality of visual facial animation values.

7. Method for generating facial animation values as defined in claim 1, wherein the tracking of facial features in the sequence of facial image frames of the speaking actor is performed using bunch graph matching.

8. Method for generating facial animation values as defined in claim 1, wherein the tracking of facial features in the sequence of facial image frames of the speaking actor is performed using transformed facial image frames generated based on wavelet transformations.

9. Method for generating facial animation values as defined in claim 1, wherein the tracking of facial features in the sequence of facial image frames of the speaking actor is performed using transformed facial image frames generated based on Gabor wavelet transformations.

10. Method for generating facial animation values as defined in claim 1, wherein the tracking of facial features in the sequence of facial image frames of the speaking actor is performed without using markers attached to the speaking actor's face.

11. Apparatus for generating facial animation values using a sequence of facial image frames and synchronously captured audio data of a speaking actor, comprising:

means for providing a plurality of visual-facial-animation values based on tracking of facial features in the sequence of facial image frames of the speaking actor;

means for providing a plurality of audio-facial-animation values based on visemes detected using the synchronously captured audio voice data of the speaking actor; and means for providing a plurality of visual-facial-animation values based on tracking of facial features in the sequence of facial image frames of the speaking actor;

means for combining the plurality of visual facial animation values and the plurality of audio facial animation values to generate output facial animation values for use in facial animation.

12. Apparatus for generating facial animation values as defined in claim 11, wherein the output facial animation values associated with a mouth for a facial animation are based only on the respective mouth-associated values of the plurality of audio facial animation values.

13. Apparatus for generating facial animation values as defined in claim 11, wherein the output facial animation values associated with a mouth for a facial animation are based on a weighted average of the respective mouth-associated values of the plurality of visual facial animation values and the respective mouth-associated values of the plurality of audio facial animation values.

14. Apparatus for generating facial animation values as defined in claim 13, wherein the output facial animation values are calculated using the following equation:

$$\left( f_n = \frac{\sigma_n^a}{\sigma_n^a + \sigma_n^v} \cdot a_n + \frac{\sigma_n^v}{\sigma_n^a + \sigma_n^v} \cdot v_n \right)_i$$

where:

$f_n$ are the output facial animation values;

$v_n$ are the visual facial animation values;

$a_n$ are the respective mouth-associated values of the audio facial animation values;

$\sigma_n^a$ are the weights for the audio facial animation values; and $\sigma_n^v$ are the weights for the visual facial animation values.

15. Apparatus for generating facial animation values as defined in claim 11, wherein the output facial animation values associated with a mouth for a facial animation are based on Kalman filtering of the respective mouth-associated values of the plurality of visual facial animation values and the respective mouth-associated values of the plurality of audio facial animation values.

16. Apparatus for generating facial animation values as defined in claim 11, wherein the means for combining the plurality of visual facial animation values and the plurality of audio facial animation values to generate output facial animation values includes means for detecting whether speech is occurring in the synchronously captured audio voice data of the speaking actor and, while speech is detected as occurring, generating the output facial animation values associated with a mouth based only on the respective mouth-associated values of the plurality of audio facial animation values and, while speech is not detected as occurring, generating the output facial animation values associated with a mouth based only on the respective mouth-associated values of the plurality of visual facial animation values.

17. Apparatus for generating facial animation values as defined in claim 11, wherein the tracking of facial features in the sequence of facial image frames of the speaking actor is performed using bunch graph matching.

18. Apparatus for generating facial animation values as defined in claim 11, wherein the tracking of facial features in the sequence of facial image frames of the speaking actor is performed using transformed facial image frames generated based on wavelet transformations.

19. Apparatus for generating facial animation values as defined in claim 11, wherein the tracking of facial features in the sequence of facial image frames of the speaking actor is performed using transformed facial image frames generated based on Gabor wavelet transformations.

20. Apparatus for generating facial animation values as defined in claim 11, wherein the tracking of facial features in the sequence of facial image frames of the speaking actor is performed without using markers attached to the speaking actor's face.

* * * * *